United States Patent Office

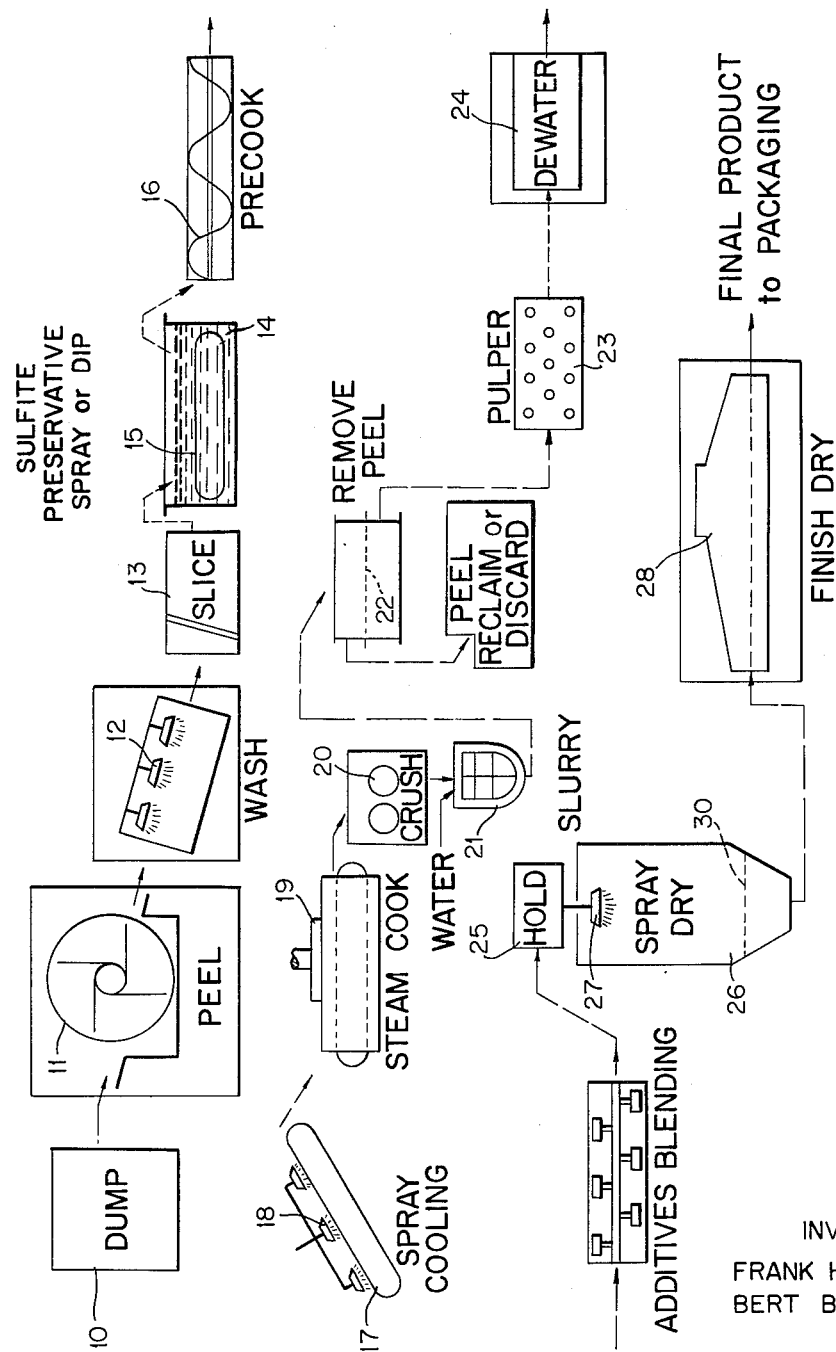

3,220,857
Patented Nov. 30, 1965

3,220,857
PROCESS FOR PREPARING DEHYDRATED
POTATOES
Frank Hollis, Jr., Hillsdale, N.J., and Bert Borders, Fort
Plain, N.Y., assignors to General Foods Corporation,
White Plains, N.Y., a corporation of Delaware
Filed July 5, 1962, Ser. No. 207,757
8 Claims. (Cl. 99—207)

The present invention relates to the dehydration of foods. It has particular reference to a process for forming a dehydrated potato product which on reconstitution yields mashed potatoes of superior characteristics.

The prior art has employed many techniques for dehydrating mashed potatoes suitable for rehydration by the consumer. Typically, potatoes have been peeled, cooked, mashed, extruded in the form of filaments, and dried; peeled, cooked, mashed and dried on roller drums; and peeled, cooked, mashed and granulated by adding back large amounts of potato powder to a wet mash followed by drying in cyclone air dryers and finish drying in a fluidized bed.

All of these processes have certain disadvantages. The products resulting from the practice of many processes are subjected to mechanical forces causing potato cell rupture and release of free starch, which introduces pastiness to the reconstituted products, particularly products reconstituted using boiling water or milk. The so-called "add-back process" wherein particles of dried, granulated or other forms of dehydrated potato are added back to a wet potato mash may yield a product which is relatively free of pastiness provided potatoes of proper solids content, maturity and storage life are used, but such a product is repeatedly exposed to elevated drying temperatures and microbial contamination, such that it suffers from flavor deterioration and may have poor storage stability; even under the most sanitary conditions the mashed potato may become contaminated with microorganisms and when repeatedly added back to the mash, a large volume of production may have to be sacrificed to maintain product quality.

Most prior art techniques for dehydrating potatoes are dependent on the starting material, i.e., the raw potatoes, for the production of the dehydrated product which will meet the standards necessary for consumer acceptance. Thus the variety, the degree of maturity, and other factors of potatoes utilized have been important in prior art processes. The solids content of some varieties, for example, is relatively low—below about 18 percent. When low solids content potatoes are used, they have been found to give a disproportionately low yield of dehydrated product, and the reconstituted potatoes tend to have an undesirable, pasty texture. Some varieties of potatoes have cells which appear to rupture easily, such rupture also resulting in a pasty product. Other varieties have deep eyes and many defects which are not easily removed by conventional peeling techniques. The degree of maturity of the potatoes, manner in which the potatoes have been stored, and other factors can also affect the characteristics of the potatoes, such characteristics resulting in a variety of unfavorable properties in the dehydrated potato product made from such potatoes. It is, therefore, one object of the present invention to provide a potato dehydration process which substantially reduces dependence on the variety, degree of maturity, and other variants in potato characteristics in order to produce an acceptable, dehydrated product.

Dehydrated potatoes produced in accordance with prior art processes have suffered from (1) excessive flavor change, (2) pasty texture, (3) grainy texture, (4) excessive browning, and (5) rancidity. It is another object of the present invention to provide a potato dehydration process which avoids each of the above-mentioned undesirable characteristics which may be present in dehydrated potato products.

It will be obvious that retention of the highest possible degree of natural potato flavor in the rehydrated product is to be greatly desired. A large portion of the flavor characteristics of a potato are concentrated in the skin and in those zones of the potato core near the skin. Consequently, it has been attempted to remove only the outer peel portions of the potato prior to cooking and dehydrating, or even process whole, unpeeled potatoes. Such processes have heretofore produced off-color products because the browning precursors are also concentrated in and near the skin of the potato. Further, attempts to screen or otherwise mechanically separate potato peel, eyes, and defects such as rot from potato solids after cooking and mashing of the potato have brought about undesirable rupture of the potato cell walls and the liberation of viscous starch. The result is a rehydrated, mashed potato that has a pasty texture. Failure to separate out the peel and other undesirable potato portions yields a product which has an uneven texture and little consumer appeal. Also, some dehydrated potato products have poor storage stability due to the fat in the dehydrated product.

In accordance with the present invention, potato material containing a substantial portion of the peel fraction in the form of peel, eyes and defects is cooked under carefully controlled conditions whereunder the core portion as well as potato meat portions circumjacent the skin of the potato can be recovered after the potato material is mashed by creating a slurry of the potato mash containing such imperfections and thereafter screening this slurry under conditions which achieve mechanical removal without converting the usable potato solids present into undesirable free starch or other forms such as contribute to pastiness in the product. Thus, raw potatoes may simply be washed to remove field dirt or superficially peeled, leaving a substantial balance of the peel fraction of the potato. The potato is subjected to carefully controlled precooking conditions, whereafter the potato cells are conditioned for the rigorous treatment to which they are subjected during slurrying and subsequent mechanical removal of imperfections; this conditioning is achieved by quenching the potato following precooking, as by reducing its temperature to below 70° F. Thereafter the quenched potato is more fully cooked, preferably under steam, and mashed to a slurryable consistency, slurried with water and screened.

The applicability of the steps of precooking followed by quenching the potato material to the alleviation, compensation and avoidance of the solids loss, texture and flavor impairment that would otherwise ensue in slurrying and later mechanical separation of undesirable portions from the potato solids, has not been appreciated by prior art workers. By not effecting complete peeling of the raw potatoes prior to cooking, valuable flavor and aroma notes are retained in the dehydrated potato product. Still, the peel, eyes, and rot are undesirable in a dehydrated potato product and are particularly disruptive of quality and ease of rehydration when the dehydration is effected by spray drying. The answer to the presence of undesirable potato portions is to remove them by slurrying the cooked potatoes and then screening or otherwise separating the undesirable potato portions from the remainder of the slurry. Yet screening tends to rupture starch cells and thus results in pastiness of the rehydrated product. The primary solution to this problem according to this invention is to incorporate the steps of precooking and quenching in a method of producing a dehydrated potato product prior to slurrying and screening of cooked potatoes.

The unusual effect of a precook-quench combination of process steps prior to final cooking of the raw potato is not precisely understood. One explanation is that the matrix between the starch cells is solubilized to permit easy separation of the cells. Whatever the reason for the effect of these two steps, that effect has heretofore only been demonstrated by the evaluation of reconstituted potato products made from dehydrated potatoes produced by a process which employs precooking, quenching, cooking, mashing, and subsequently dehydrating the mashed potatoes. The unusual effect of precooking and quenching raw potatoes on a subsequent slurrying and screening of a cooked potato product has not been recognized by the art. Yet, it is this effect which makes possible the screening of the slurried, cooked potatoes without excessive rupture of the cell walls of the potatoes and consequent pastiness of the rehydrated product.

The necessity of a precook-quench series of process steps is even more accentuated when the slurried potatoes which are subsequently screened to remove the discrete peel imperfections are dehydrated by means of spray drying. In a spray-drying process, during the course of passage of the potato slurry through the atomizer, potato agglomerates are subjected to further frictional forces and to further subdivision into particles of a smaller size than those which are incurred incident to screening. These forces also tend to rupture the cell walls and induce pastiness in the reconstituted product, and so, where slurried potatoes are screened and then spray dried, there are two process steps during the course of which potato cell walls are subjected to mechanical forces which tend to rupture them.

The precook-quench steps greatly mitigate this tendency toward rupture. In order to augment the unusual effect of the precooking and quenching operations on a subsequent slurrying step, it has been found advantageous to incorporate other materials in the process at various stages thereof in order to further harden the walls of the potato cells in the slurry. Thus, calcium chloride is preferably incorporated in the slurry in an amount sufficient to harden substantially the walls of the potato cells therein. Calcium chloride may also be incorporated in the precook liquid or the medium which is used to quench the precooked potatoes, and increases the cell wall hardening proclivity of the precook-quench steps when so incorporated. Further, a monoglyceride emulsifier which is an ester of a polyhydric alcohol and a higher fatty acid is preferably added to the slurried, screened potato product in order to further enhance the texture of the rehydrated product. An inert cellulose composition is advantageously added to the slurried, screened product to aerate the final product after dehydration and give it fluffiness. All such improvements, however, are in addition to the basic combination of steps which comprise precooking and quenching raw potatoes which either have not been peeled or only incompletely peeled, cooking and mashing the potatoes, then slurrying the mashed potatoes, screening undesirable potato portions from same, dewatering the slurry, and finally dehydrating the slurry to a stable moisture content.

Referring now to the process of our invention in detail, the raw potatoes which are the starting material for obtaining the dehydrated potato product may be any of many varieties, even those which have heretofore been found undesirable because they possess a low solids content. Of course, potatoes having a relatively high solids content are still to be preferred, but potatoes of low solids content may still be utilized as a starting material. Potatoes such as Idaho Russet Burbank potatoes, having solids content by weight from about 21 percent to more than about 23 percent, have been found of particular value.

In its preferred form, the process of the present invention comprises an initial step of removing adhered foreign matter from raw potatoes. As a result undesirable portions remain on the potatoes. The potatoes can be merely washed to remove dirt or incompletely peeled, by which is meant that degree of peeling where all undesirable potato portions, which include rot, eyes, and skin, have not been removed. Incomplete peeling may be effected by such well known operations as steam peeling, abrasion peeling, lye peeling and flame peeling. In its most preferred embodiment the raw potatoes are not initially peeled, since this is most economic from the point of view of commercial production and permits the retention of a maximum quantity of flavor and aroma characteristics in the dehydrated potato product. In that most preferred embodiment the potatoes are scrubbed and washed, however.

If a peeling step is the initial step of the present invention, such peeling will be followed conventionally by washing, during which skin portions which have adhered to the raw potatoes will be removed from the peeled, raw potatoes. The potatoes may now be sliced in either unpeeled or partially peeled condition so that, in subsequent precooking and cooking steps, these cooking operations may be carried out with greater efficiency due to an increased area of exposure to heat of sliced potatoes as opposed to whole potatoes. Slicing is, however, only a preferred procedure and other means of subdividing the raw peeled potatoes may be effected to increase the surface area of the potatoes; less desirably, the potatoes may be left in an undivided state. If the potatoes are sliced, slicing into pieces about one-half to one inch in thickness is preferred, and a particularly advantageous range has been found to be a thickness of from about five-eighths to three-quarters of an inch.

Following subdivision of the potatoes and an optional inspection to remove manually eyes and large pieces of rot, the subdivided potatoes are subjected to a bisulfite dip in order to inhibit darkening of the potatoes subsequent to the exposure of the cortex of the potato by slicing. The bisulfite dip is followed by immersion in an aqueous solution of sodium acid pyrophosphate, which prevents after-cooking darkness. The sodium acid pyrophosphate may be incorporated in the water utilized to quench the precooked potatoes as well as in the precook water. By adding the pyrophosphate to the precook medium a grey color in the final dehydrated potato product is mitigated and a separate pyrophosphate dip is avoided.

A precooking operation and the subsequent quenching of the precooked pieces is described in U.S. Patent No. 3,012,897 to Sullivan et al. The precooking step embodies holding the raw potatoes in an aqueous medium at a temperature of about 140° F. to 195° F. for a period of about 5 to 60 minutes. The precise time and temperature of the precook will vary in accordance with whether the raw potatoes have been subdivided, the degree of subdivision of the potatoes, the source and maturity of the potatoes and other factors. It will be apparent to one skilled in this art that the greater the subdivision of the potatoes so that there is a larger surface area exposed per volume of potatoes, the less will be the degree of precooking required to achieve a predetermined effect on the potato structure. Also, there is necessarily a correlation between the temperature of the precook and the time for which the precooking operation is carried out; generally, the longer the time of precook, the less the temperature at which the potatoes should be maintained during the precooking treatment. Preferably, it has been found desirable to effect precooking at about 140° to 180° F. for 15 to 60 minutes, better still about 160° F. to about 180° F. for about 10 to 30 minutes. The precise change in the structure of the potato cell due to precooking is not known; however, precooking should be carried out for a period of time and at a temperature which will effect removal of free starch, soluble proteins, and reducing sugars from surface areas of the potatoes, yet which will not result in a fully cooked potato.

The quenching step which follows precooking may be effected by immersing the precooked potatoes in an aqueous medium or spraying the aqueous medium on the precooked potatoes. The temperature of the aqueous medium and the time period during which the precooked potatoes are subjected to the aqueous medium in the quenching step will also vary. It is preferred to quench the precooked potatoes to as low a temperature as is practically possible, preferably to a temperature below room temperature by such an aqueous medium as cold tap water. In place of cold water, cold brine followed by washing in fresh water is a satisfactory modification. Refrigerated air may be circulated through the partially cooked potato material, and another method is to mix the potatoes with shaved ice. All these methods of cooling will be generally referred to as quenching. The temperature to which it is desired that precooked potatoes be lowered is preferably less than 100° F., and still more preferably, less than 70° F. The time required to achieve cooling to the predetermined temperature will depend on variables such as the piece size of the potatoes and the nature and temperature of the cooling medium. When ice water is used as a cooling medium, a time of about 10 to 30 minutes has been found sufficient to effect cooling to a temperature below 70° F.

Subsequent to quenching, the partially cooked, quenched potato pieces are separated from the cooling medium as by draining, and cooked until they are soft enough to mash. Such complete cooking is desirably effected by means of saturated steam at atmospheric pressure, although steam cooking under pressure, water cooking, and other known methods are also acceptable. While the temperature of atmospheric steam will, of course, vary in accordance with the atmospheric pressure at a particular location, a cooking time of from about 10 to 60 minutes has generally been found to be sufficient to effect complete cooking of precooked, subdivided potato product where steam at atmospheric pressure is used. Whether boiling, steaming, or any other method is employed, cooking should be continued until the potato pieces are completely cooked throughout, but should not be carried to the point where the starch begins to coalesce as a result of over-swelling and bursting of the starch cells.

The cooked potatoes are then mashed or crushed. Crushing rolls or belts which in the case of rolls may have a setting of about 0.018 to 0.060 inch between the rolls, can be utilized. In its most advantageous form, mashing should result in a subdivided product with a minimum of agglomerates and a minimum of ruptured starch cells. Mashing rolls with continuous mashing surfaces are preferred. The temperature of the cooked potato pieces may vary during the mashing operation, but the potatoes are usually mashed while hot.

The potatoes are now slurried with water or other aqueous medium, such as water containing calcium chloride in small quantities, e.g., about .01 to 3.0% by weight of the potatoes. This salt serves the same basic function it served when incorporated into the precook medium or the quenching-medium following the precook. Sufficient aqueous medium is added to the cooked potatoes to form a fluid slurry of the potatoes and the medium. While the precise degree of dilution of the potato mash with an aqueous medium, preferably warm, will vary, it has been found that a general range of about 7 to 16 percent solids content of the slurry after dilution is most preferred. Generally, the amount of water or aqueous medium added should be such as to put the slurry in a fluid state in which it can be easily and advantageously subjected to mechanical separation of portions thereof, while limiting the quantity of water to a point at which it will still be practical from an economic viewpoint later to dewater and/or dehydrate the slurry.

The temperature of the slurry and the length of time during which the potatoes are maintained in the form of a slurry are limited. At too high a temperature, undesirable bacteriological and chemical reactions may occur and the possibility of potato cell rupture is enhanced. All such undesirable occurrences can lead to loss of flavor and color, oxidative rancidity, and excessive pastiness. Thus a slurry temperature range of between 60° and 180° F. has been found to be suitable.

The slurry is now subjected to a mechanical separation during which the skin, eyes and rot, classified as undesirable potato portions, are separated from the slurry. An efficient method of effecting such mechanical separation is to pass the slurry over screens through which the aqueous medium and desirable potato portions will pass and on which will be suspended the undesirable potato portions. The slurry may be passed through a U.S. standard No. 6 to No. 14 screen, preferably a vibrating U.S. standard No. 8 screen in order to remove the skin, eyes, and rot. After the undesirable potato portions have been removed, a slurry containing screened potato particles with some amounts of solubilized, ruptured starch and solubilized reducing sugars and protein, and some specks of peel, eyes and rot, remains. The amount of ruptured starch cells has been greatly reduced by the precook-quench treatment to which the raw potatoes had been subjected. Although not mandatory, it has been found advantageous to remove these specks by passing the slurry through a pulper having a screen with apertures from about 0.018 to 0.040 inch in maximum dimension, preferably 0.020 to 0.030 inch, which pulping permits individual potato cells to pass through and subdivide the larger potato aggregates so that they will also pass through the mesh screen. Screening operations may be carried out under pressure or vibration. The specks of peel, eyes and defects are retained on the screen.

Following the mechanical separation of undesirable potato portions, the slurry is preferably dewatered, e.g., by vacuum filtration, to remove substantially all of the free ruptured starch, soluble reducing sugars, and some of the proteins which have been solubilized in the slurry medium. Also removed are fats and free amino acids. The more water which is drawn off, the more undesirable factors which are removed from the potato product. Most advantageously dewatering is carried out until the solids content of the dewatered potatoes is substantially equal to the solids content of the raw potatoes which are being processed. After dewatering, clean potato cells substantially free of soluble and insoluble starches and sugars and partially free of fats, soluble proteins and free amino acids remain.

Subsequent to dewatering, the cleaned potato cells are preferably blended with additives, such as an aerating agent, typically methyl cellulose. Methocel is a water-soluble, inert, colorless, odorless, tasteless, non-toxic cellulose ether which, when mixed with potato granules, imparts a fluffiness to the granules. About 0.25% to 3% Methocel per weight of potato solids is a preferred range.

Other preferred additives are emulsifiers, typically those which are identified herein as monoglycerides and which materially offset any pasty, gummy texture that might otherwise be produced in a reconstituted potato made from the dehydrated potato product produced herein, and achieve instead a mealy, non-pasty product. Generally about 0.10 to 2.5% of emulsifier is used, based on the weight of the potato solids.

As used herein, the term "monoglyceride" is not intended to foreclose the presence of other fatty acid esters, such as triglyceride and diglyceride fats, the diglyceride esters also being operative to a lesser extent and usually being present as an impurity in products commercially available as monoglycerides. Monoglycerides are generally those products produced by direct esterification or by molecular distillation of a reaction mixture including triglyceride fats, and will vary in their degree of esterification and fatty acid identity. It is preferred for purposes of the present invention that the monoester comprise from about 40 to 100%, preferably 90%, of the total ester. Generally, as the level of monoester increases, freedom from pastiness correspondingly increases. Typical of those monoglycerides which are available commercially and are useful as emulsifiers in the present invention are those series of products identified by the trade-mark "Myverol." Myverols are distilled monoglycerides prepared from various fats and oils and are edible. Other exemplary monoesters suitable for use are propylene glycol monostearate, propylene glycol monooleate, diethylene glycol monostearate, propylene glycol monopalmitate, propylene glycol monomyristate, and propylene glycol monolaurate. Monoglycerides and inert cellulose ethers may be incorporated into the product at several points in the process, e.g., in the slurry or mash, but are most economically added to and blended with the screened, dewatered filter cake. They can also be blended with the dehydrated product.

The dewatered potatoes with additives are now dehydrated by any of several conventional means. When the final, dehydrated products are desired to be obtained in flake form, it has been found desirable to dehydrate the dewatered potatoes by single or double drum drying processes, either at atmospheric pressure or under vacuum. Drum drying is well known in the art and will not be further described here in detail. Other methods of dehydration, e.g., tunnel drying, vacuum drying and drying by means of a rotary dryer are also adaptable for use. If it is desired that the potatoes be dehydrated in the form of shreds, then the potatoes, either with or without prior whipping to incorporate sufficient air into the potatoes to increase their volume by 10 to 30%, may be riced or extruded in the form of shreds while preventing appreciable cell damage during such extrusion. These shreds may be dried by depositing a mass thereof on a supporting screen and thereafter circulating dried, heated air at a high velocity, e.g., at a rate of about 150 to 300 linear feet per minute, through the mass of shreds. By the use of this air drying method air temperatures of from 180° F. to as high as 280° F. may be used without causing bursting of the cells or exterior damage, such as scorching to the shreds. Such a method is described in U.S. Patent No. 2,481,122 to Kaufman et al. Air drying is followed by final drying at lower temperatures. Whatever method of dehydration is utilized, moisture should be removed from surface areas of the flakes, granules, or shreds at a sufficiently rapid rate so that the wall of the potato particles will be made rigid against collapse while preventing cell damage due to excessive heat.

While dehydration may be carried out through the use of any of several well-known methods, the process of our invention has been discovered to have particular utility when dehydration is effected by spray drying the dewatered potato blend. Though care must be exercised throughout the spray drying process to minimize damage to the walls of potato cells, the prior treatment, including precooking, quenching, slurrying and screening, has provided a product which is relatively resistant to cell wall damage during spray drying and consequent pastiness of the final dehydrated product. Resistance to cell wall damage is further enhanced by the incorporation of calcium chloride in any or all of the precooking, quenching, cooking or slurrying media. In addition, a screened potato product is partly prepared for spray drying, since large potato agglomerates have been removed by screening.

The dewatered filter cake is reslurried and subdivided into particulate form by means such as a centrifugal bowl atomizer, care being exercised throughout the atomization and spraying to minimize frictional and other forces which may be experienced as the slurry issues from the periphery of the bowl into the drying chamber.

Preparatory to spray drying, the reslurry is preferably maintained at a temperature above room temperature but below the boiling point of water, most preferably below 100° F. While the reslurry may be fed to the atomizer at room temperatures, improved feed of reslurry and drying efficiency is realized when the aforesaid elevated reslurry temperature range is practiced.

The specific spray drying process to be employed can vary, e.g., drying can be accomplished by a cocurrent or countercurrent gas flow. The temperature of the circulating drying gas in the drying chamber is less than that which will produce a scorched, undesirable product; inlet air temperatures of about 250° F. to 450° F. may be employed with efficient dehydration and acceptable resultant product color and flavor, although the temperature of the product generally does not exceed 130° F. to avoid excessive browning and toasting.

The invention will be better understood by reference to the accompanying drawing, which forms a part of this disclosure and in which:

The figure is a flow sheet diagram which represents a preferred process according to the present invention. This diagram will be referred to in detail with reference to the first of the following examples of preferred embodiments of our processes.

*Example A*

Field run Idaho Russet Burbank potatoes (utility grade) having a solids content between 18 and 26% were selected. These potatoes had been stored prior to processing at a temperature of 55° F. and an ambient relative humidity. The potatoes had the customary amount of rot for a utility grade batch of potatoes. Immediately prior to processing they were conditioned for two weeks by storage at 70° F. in an air-conditioned room having 50% relative humidity; after two weeks of storage the potatoes had a total sugars content of less than 5% and a level of reducing sugars measured as dextrose of 1.9% by weight of the potato solids (dry basis).

The conditioned potatoes were removed from the dump bin 10 and brush scrubbed, 20 pounds at a time, and subjected to treatment for two minutes in an abrasion peeler 11 modified to include a stiff rotating brush and a rubber-covered side wall. The potatoes were then subjected to a direct spray of water from spray heads 12. As a result of this scrubbing and washing, the potatoes had removed therefrom that amount of the outer skin which sufficed to remove all surface dirt. The clean potatoes still contained substantially all of the peel, eyes, surface bruises, and rot wherever it occurred. The thoroughly cleaned potatoes were sliced to $11/46''$ in a slicer 13 and then soaked in a 0.2% sodium metabisulfite solution 14 for 30 minutes to inhibit post-slicing browning and for darkening of the potatoes. Transportation through the solution was provided by a conveyor belt 15.

The raw, sulfite-treated potato slices were then precooked by immersion in a 2% sodium acid pyrophosphate aqueous solution at a temperature of 160° F. The slices were advanced by means of a screw conveyor 16 countercurrent to the flow of solution. The potatoes were treated for a period of approximately 20 minutes or until the internal temperature of the potato was 150°–160° F. During this step of the process the potato slices rapidly assumed a temperature of 150° F. and were maintained at a temperature somewhat below 160° F. for the balance of the treatment. Incident to this precooking operation, sugars, starch, protein, and fat were partially extracted; thus, at the end of this precooking step potato slices were leached to a point wherein the total sugars present were 1.85% and the reducing sugars content measured as dextrose was 0.83% by weight of the potato solids (dry basis); the solids content of the potatoes had not materially altered during this period. The sodium acid pyrophosphate acts in the manner of a chelating agent, minimizes the creation of post-cooking discoloration and arrests penetration of color precursors from the peel into the interior of the potato during precooking and subsequent steaming.

The precooked slices were discharged onto an inclined belt conveyor 17 on which they were subjected to cold water sprays directed on the belt by means of spray nozzles 18. The temperature of the water directed from the spray nozzles 18 was about 50° F. and the potato slices remained on the conveyor belt 17 for about 25 minutes or until the internal potato slice temperature was reduced to less than 70° F. By virtue of this precooking and water quenching, the ultimately cooked and mashed potatoes, when subjected to those operations which serve to remove mechanically rot, peel, eyes, bruises, can be successfully maintained in a condition in which they do not become extremely pasty, which would be the case if precook and quenching operations were not carried out in the early steps of the process. Without precooking and quenching, mechanical handling of the potato solids incidental to pulping, screening, pumping, dewatering, and reslurrying thereof will occasion modification of the starch of the potato cells resulting in a pasty reconstituted potato product, particularly in those cases where the potato whips after reconstitution necessary to produce the textural characteristics of mashed potatoes derived from fresh potatoes.

In addition, the precook-quench treatment assists in endowing the potato solids with the ability to be reconstituted in hot boiling water, although this property is also attributable to the treatment involved in slurrying and dehydration. Also, by virtue of the precook and quench described above, the yield of potato solids recovered from the mashing, pulping and slurrying thereof is optimized. The quenched potatoes had a total sugars content of 1.57% and a reducing sugars content of 0.69%.

After cooling the potato slices were immediately transferred into a continuous belt stream cooker 19, wherein saturated steam was introduced at atmospheric pressure for a period of 22 minutes or until the potatoes were cooked to a mashable condition. As a result of steam cooking, the potato cells retained starch which was substantially gelatinized, and a cooked flavor was produced. This flavor was enhanced by reason of the flavor values in the jacket and shell portions of the potatoes as well as the underlying flavor values in the peripheral meat portions of the potatoes being infused throughout the potatoes. The solids content of the potatoes remained substantially constant during mashing.

The cooked potatoes were then conveyed by a belt to a set of opposite rotating stainless steel crushing rolls 20 which had a clearance between them of 0.040 inch, the rolls having a diameter of 12 inches and rotating at 22 r.p.m. By virtue of the gradual and gentle reduction of the cooked potato slices as they are passed through the pinch between the rollers, the potatoes are gently crushed so that the potato cells are damaged to a minimum extent. The potato mash still contains all of the peel, eye and defects present on the slices together with the subdivided potato solids which have undergone a cleavage of the bonds aggregating them; the mash still contains cell aggregates in addition to individual potato cells. The heterogeneous mash of potato cell is not mashed, however, to a point where a dough-like consistency is produced, or wherein the potato cells are homogeneously subdivided. The mashed potatoes have the appearance of clumps of a baked potato which have been spooned or otherwise removed from the jacket.

The resulting mash was blended continuously with an equal weight of water at a temperature of 50° F. in a slurry mixer 21 to yield a slurry having a solids content of between 9 and 12%. Included in the slurry water was a quantity of anti-oxidant and that amount of metabisulphite solution measured as 50 p.p.m. sulfur dioxide. The homogeneous mixture thus produced had a temperature of about 110° F. and was immediately pumped to and passed over a vibrating 8-mesh screen 22. The slurry was immediately subjected to screening to prevent flavor loss and conditioning of the potato solids to an extent that results in graininess of the reconstituted mash. Preferably the slurry of potato solids is not elevated to a temperature above 130° F. to mitigate cell rupture. Screening of the slurry removed pieces of peel, eyes and rot, which can either be discarded or reclaimed.

After passing through screen 22, the slurry is directed to a pulper 23, which as a screen having 0.033 inch openings. Most of the peel, the large eyes and defects having been retained as overs on the 8-mesh screen 22 together with a minimal quantity of "potato meat" which is separately handled and preferably recycled to the homogeneous mixture of potato solids, the thrus fed to the pulper 23 may be described as a relatively clean suspension of potato cells including some solubilized starch and other solubilized chemical constituents including fats and sugars, protein, and amino acids, as well as free starch. In pulping the thrus, small peel, specks, eyes, and residual rot are retained on the pulper screen and by-passed. The slurry solids are thus impelled through the screen openings which retain the undesirable portions as described above. In carrying out the pulping operations, care is exercised to avoid too vigorous agitation of the slurry solids, such as would damage the potato cells, hence the pulper is operated at an r.p.m. sufficient to impel the slurry solids through the screen openings of the pulper, but not sufficient to materially alter the physical condition of the potato cells themselves, although a minimal amount of cell rupture takes place. By virtue of the precook-quench conditioning of the starch, the conversion of the potato meat into the form of mashed aggregates and then potato cells is carried out with a minimum of cell damage which would otherwise occur and seriously distract from potato texture and yield.

The pulped slurry was then dewatered to approximately 17% solids by passage over a continuous, straight-line filter 24. Dewatering is necessary to remove significant portions of fat, protein, free and solubilized starches, sugars, and other browning precursors and off-flavor reactants which seriously detract from stability of the dehydrated potato product. Thus the pulped slurry is dewatered to a solids content approximating the solids content of the raw potato from which the slurry is derived. For some dehydration applications, such as drum drying, this dewatering should be carried out to the point compatible with this manufacturing practice, to wit, as high a solids content as possible. By creating a high-solids filter cake, the drum-dried product produces a much higher density flake which can be reconstituted without pastiness. A continuous straight-line filter operating on a vacuum principle of maintaining a cell on one side of a foraminous member, i.e., a fine web cloth mesh, serves to rapidly draw the free water, the dissolved solids, and suspended materials therein rapidly through the slurry. In effecting dewatering, the pulp slurry should be deposited on the filter cloth at a depth of ⅛ to ¼ inch. The attainment of higher vacuums will, of course, allow the maintenance of thicker beds. Below this depth an adequate vacuum cannot be maintained, thus reducing efficiency of removal of the above materials and solids. At too high a bed depth, adequate vacuum cannot be achieved, and hence the removal of water is at such a rate as results in the occlusion or inadvertent absorption of undesirable solids. After dewatering, the potatoes had a total sugars content of 0.93% and a reducing sugars content of 0.28%.

The filter cake from dewatering was blended with Myverol 1807, methyl cellulose (Methocel), an antioxidant (butylated hydroxytoluene, propylene glycol and citric acid in solution of propylene glycol) and a combination of sodium sulphite and sodium metabisulphite, to yield 0.5% of the mono- and diglyceride emulsifier, 1.25% methyl cellulose, 50 p.p.m. anti-oxidant, and 50 p.p.m. sulphur dioxide, all on a dry weight potato solids basis. The thoroughly blended filter cake was diluted to 10% solids by the addition of fresh cold water (60° F.) and the resultant homogeneous slurry at a temperature of about 60° F. was transported to a holding tank 25 directly above a spray drying tower 26. In transferring the reslurried potato solids to the tower, care was exercised to avoid potato cell damage. Since the viscosity of the slurry is dependent on the solids content and the temperature of the slurry, adjustments will be called for in effecting this transfer.

The spray drier 26 employed was a vertical elongated cylindrical tower 41' high and 12' in diameter. Twelve feet from the bottom of the tower the tower assumes a conical shape, the cone ending in a discharge opening at the bottom of the tower. The spray tower was equipped with a cyclone dust collector for collection of fine potato particles which are combinable with the dehydrated product collected at the bottom of the tower. The potato slurry was pumped to a smooth, three tier, 9" bowl atomizer 27 rotating at 4,600 r.p.m. The atomizer was located at the center of the 12' tower, 2'3" from the top of the tower and operated to form a pattern whose outline covered the entire cross-sectional area of the tower. The droplets formed descended cocurrently with a downward draft of hot drying air at an inlet temperature of 425° F., which air was introduced at the top of the tower at 3,000 to 6,000 s.c.f.m. The slurry was fed from the top of the tower at one and two-thirds g.p.m. The droplets were dehydrated as they descended for collection at the trough of the tower bottom. The outlet temperature of the dehydrating air was maintained at 230°–245° F. dry bulk and measured at the outlet point of exit for the product. The product at about 6% moisture was collected from the tower and the cyclone communicating with the point of exit and combined. The product was then passed over a vibrating 16-mesh screen with the thru mesh fraction being retained as the final product, or optionally further dried in tunnel dryer 28.

As the droplets descend in the spray dryer 26, they undergo an elevation in temperature at the upper extremity of the tower and thereafter a reduction in temperature. When sifted through a vibrating 16-mesh screen 30 at the bottom of the dryer, the product has an overall temperature of 230°–245° F. It is cooled to 150° F. in about one second. In atomizing extreme care must be taken to ensure that potato cells do not undergo such stresses as will cause excessive cell rupture and consequent product pastiness. In carrying out atomization in a centrifugal bowl atomizer, the slurry is metered onto a rotating smooth flat disc where through centrifugal force particles are produced the size of which is dependent upon the speed of rotation of the disc, the rate of feed of charge material to the disc and a number of other factors. In carrying out such atomization, it is desirable to avoid creation of such fine particles as are caused by undue shearing. The rotational speed of the disc is maintained such that the individual potato cells are impelled outward and separated from one another and yet cell rupture due to excessive shearing caused by higher rotational speed is minimized or avoided.

By virtue of the substantial removal of extraneous undesirable potato solids and materials, such as fats, proteins, amino acids, solubilized sugars and starches, the potato particles that are ultimately dehydrated through atomization have the desired mealy non-pasty and yet not grainy texture of fresh mashed potatoes. Further, by the critical dewatering of the potato cells so that they are substantially free of such extraneous materials, the condition of the reslurried potato solids is such that less force is called for in subdividing the slurry through atomization into desired particles. The emulsifier present appears to complex with any residual free starch, thus mitigating the damage to potato cells that may be caused in good spray-drying atomization.

The system thus described permits the preparation of a creamy, yellow-colored powder having a density of 0.4–0.5 gms. per cc. The product is generally in the form of individual potato cells and small agglomerates of potato cells, which cells have a mean diameter of about 150 microns. When 82 gms. of the dry product are dry-blended with 6% non-fat milk solids and reconstituted in 390 cc. of boiling water containing ½ tsp. salt and 2 tbsps. butter, a very dry, mealy mash was produced quite like the texture of baked potatoes. With the subsequent addition of 60 cc. cold milk followed by vigorous mixing, a very light, fluffy, non-pasty product with a creamy color was prepared. This product was devoid of a scorched flavor and free of specks of unrehydratable particles and clusters; the product was quite like freshly mashed potatoes. This product has a number of unique and novel recipe characteristics as distinguished from dehydrated potatoes of the prior art, e.g., whereas when other prior art dehydrated mashed potato products are contacted directly with boiling water they will turn pasty, the present product will retain a light, fluffy, mashed potato texture. The spray-dried product had a total sugars content of 0.86% and a reducing sugars content of 0.27%.

The spray-dried potato powder of this invention is quite amenable to the relatively harsh treatment involved in direct reconstitution with boiling water, that is, the product does not become pasty even on vigorous whipping. On the other hand, the product of this process can be reconstituted in hot water at temperatures below boiling (say above 150° F.) and will readily rehydrate without clumping or leaving partially rehydrated grits, and without introducing additional graininess or superfine, floury texture to the product; this product can also be whipped to the desired light, fluffy non-pasty product.

The reconstituted and whipped product, that is, a product which has been reconstituted in boiling water to which milk has been added subsequent to reconstitution and which has thereafter been whipped by hand, will be seen to have light creamy color, the ability to be mounted by a spoon, fork or similar utensil and hold its shape, yet it will have a smooth, uniform surface after such utensil has passed over the mash. To the touch the product is light and fluffy. When the product is eaten, this light, fluffy texture is evident in the mouth with no detectible pastiness, that is, the product will not cling to the roof of the mouth during eating. Of course, no specks or undesirable extraneous matter is evident; even when the product cooled, although its consistency increases to some extent, there is no increase in heaviness and no increase in pastiness, but rather the original, desirable textural attributes of fluffiness are maintained.

Further, the product of the invention when reconstituted and whipped provides a higher bulk volume per gram of dehydrated product than any other dehydrated mashed potato of the prior art now of commerce. This spray-dried product has a relatively narrow particle size distribution by virtue of which a narrow weight tolerance can be maintained by measuring the product in volume measures, such as a cup measure. This results in improved product performance, since the greater control of weight as measured by volume assures a more accurate solids-to-liquid ratio when prepared by the consumer.

The spray-dried product of this process has acceptable storage stability; the product when packed in an inert gas such as nitrogen will have a shelf life of 12, 6 and 3 months, respectively, under storage conditions where the product undergoes a temperature not in excess of 70°, 100°, 120° F. The product can be air veyed or otherwise handled in plant equipment and will not undergo such damage as will produce product pastiness. The reconstituted and whipped product can be maintained for a reasonable period of time (say up to three hours) at an edible temperature of 150°–180° F. without undergoing a change in color or creation of an off-flavor; thus, the product has a longer stability in a steam table than other products of commerce.

When viewed under a 75-power stereomicroscope illuminated on a stage using incandescent light, the spray-dried particles appear as irregular aggregates of non-uniform shape. When such light is transmitted through these aggregates, individual potato cells will be discernible; a network of black-appearing lines will be seen either in or on the surfaces of the cells and agglomerates. While prior art granules may also give a similar optical response under incandescent light, the prior art granules transmit light through the center of the product but to a lesser extent than our spray-dried material, and are shaded around their periphery, which is rounded as distinguished from the jagged, irregular outline of the spray-dried aggregates of this invention.

When viewed under a high power microscope (900 diameters) under an incandescent light, the spray-dried product of this invention has an unshriveled, rough-edged appearance; the black network of lines observed under a 75-power microscope are now more distinguishable and fissures between the lines can be observed. As distinguished from potato granules of the prior art, the exteriors of the present individual particles do not appear to be collapsed, whereas the granules have dark bands which will not transmit light and appear to indicate a collapsing and shrinking of the cells at the exterior of the granule.

*Example B*

In lieu of producing a spray-dried product of the type of the foregoing Example A, a flake-type product may be produced. All of the additives except the methyl cellulose that were added to Example A are added to the filter cake to prepare a product for drum drying, provided, however, that the level of anti-oxidant and sulphite is reduced by 50%. A solution of methyl cellulose representing 1.25% of the potato solids is added to the filter cake. Blending is accomplished in a 120-quart Hobart mixer at low speed (speed 1). After blending for five minutes, the blended product is whipped for one minute by raising the speed of the Hobart mixer to provide medium action (speed 2). Whipping they dry blend prior to drum drying yields a fluffier, better aerated product.

The whipped blend was then dehydrated on a stainless steel, single drum dryer three feet in diameter and rotating at 2.5 to 3.0 r.p.m. A knife blade was used to remove the dehydrated potatoes (about 7% moisture) from the rotating drum. The dried product, which was in sheet form, was reduced in size to the form of flakes and packaged. While the drum-dried product is not the preferred form of our potato product, it did exhibit most of the advantageous properties of the spray-dried potatoes produced in accordance with this invention. On rehydration, the drum-dried potato flakes yields a product substantially free of specks and clusters of potato particles which are difficult to rehydrate. The flakes rehydrated with boiling water to form a mashed potato product having an even, smooth, non-pasty texture. Storage stability was also found to be quite acceptable.

It will be apparent that certain alterations and modifications in the process described hereinbefore and diagrammatically illustrated in the drawings will be made by those skilled in this art without departing from the scope of our invention. All such alterations and modifications are deemed to fall within the purview of the present invention, which is to be limited only by the scope of the following, appended claims.

What is claimed is:

1. A process for preparing a dehydrated potato product, consisting essentially of removing adhered foreign matter from raw potatoes to leave skin, eyes and defects as undesirable portions on the potatoes, precooking the potatoes at 140° F. to 195° F. for about 5 to 60 minutes in an aqueous medium, quenching the precooked potatoes until the temperature thereof is less than about 100° F., cooking the quenched potatoes until they are soft enough to mash, mashing the cooked potatoes, slurrying the mashed potatoes with sufficient aqueous medium to form a slurry containing about 7 to 16% potato solids and including said undesirable potato portions, mechanically separating said undesirable potato portions from said potato slurry, and dehydrating said slurry to a stable moisture content.

2. A process as claimed in claim 1, in which the potatoes are precooked at 140° F. to 180° F. for about 15 to 60 minutes.

3. A process as claimed in claim 1, in which the precooked potatoes are quenched in an aqueous medium.

4. A process as claimed in claim 1, in which said precooking aqueous medium contains calcium chloride in an amount sufficient to substantially harden the walls of the potato cells subjected to precooking.

5. A process as claimed in claim 1, in which the mechanical separation of undesirable potato portions is carried out by passing the slurry over a U.S. standard No. 6 to No. 14 screen.

6. A process for preparing a dehydrated potato product, consisting essentially of removing adhered foreign matter from raw potatoes to leave skin, eyes and defects as undesirable portions on the potatoes, precooking the potatoes at 140° F. to 195° F. for about 5 to 60 minutes in an aqueous medium, quenching the precooked potatoes until the temperature thereof is less than about 100° F., cooking the quenched potatoes until they are soft enough to mash, mashing the cooked potatoes, slurrying the mashed potatoes with sufficient aqueous medium to form a slurry containing about 7 to 16% potato solids and including said undesirable potato portions, mechanically separating said undesirable potato portions from said potato slurry, dewatering the slurry to a filter cake incorporating in the filter cake a monoglyceride emulsifier in an amount sufficient to substantially reduce the pastiness of the final product, and dehydrating the blended filter cake to a stable moisture content.

7. A process for preparing a dehydrated potato product, consisting essentially of removing adhered foreign matter from raw potatoes to leave skin, eyes and defects as undesirable portions on the potatoes, precooking the potatoes at 140° F. to 195° F. for about 5 to 60 minutes in an aqueous medium, quenching the precooked potatoes until the temperature thereof is less than about 100° F., cooking the quenched potatoes until they are soft enough to mash, mashing the cooked potatoes, slurrying the mashed potatoes with sufficient aqueous medium to form a slurry containing about 7 to 16% potato solids and including said undesirable potato portions, mechanically separating said undesirable potato portions from said potato slurry, dewatering the slurry to a filter cake, incorporating in the filter cake a non-toxic cellulose ether in an amount sufficient to impart fluffiness to the final product, and dehydrating the blended filter cake to a stable moisture content.

8. A process for preparing a dehydrated potato product, consisting essentially of incompletely peeling raw potatoes to leave skin, eyes and defects as undesirable portions thereon, washing the peeled potatoes, slicing the potatoes, precooking the potatoes at about 160° F. to 180° F. for about 10 to 30 minutes in an aqueous medium, quenching the precooked potatoes in an aqueous medium until the temperature thereof is less than about 100° F., steam cooking the quenched potatoes until they are soft enough to mash, mashing the cooked potatoes, slurrying the cooked mashed potatoes with sufficient aqueous medium to form a slurry containing about 7 to 16% potato solids and including said undesirable potato portions, screening said undesirable potato portions from the potato slurry, dewatering the screened potato slurry, blending with the dewatered slurry a monoglyceride in a quantity sufficient to substantially inhibit pastiness in the final product, reslurrying the blend to a consistency appropriate for dehydration, and dehydrating the reslurried blend to a stable moisture content.

References Cited by the Examiner
UNITED STATES PATENTS

| | | | |
|---|---|---|---|
| 1,571,945 | 2/1926 | Heimerdinger | 99—207 |
| 2,564,296 | 8/1951 | Bostock | 99—207 |
| 2,759,832 | 8/1956 | Cording et al. | 99—207 |
| 3,012,897 | 12/1961 | Sullivan | 99—207 |
| 3,027,258 | 3/1962 | Markakis et al. | 99—207 |

OTHER REFERENCES

U.S. Dept. of Agriculture—Agricultural Research Service ARS–73–25, July 1959, Potato Flakes by Cording, Jr., et al.

U.S. Dept. of Agriculture—Agricultural Research Service ARS–73–2, Nov. 15, 1954, Potato Flakes—A New Form of Dehydrated Mashed Potatoes, by Cording, Jr., et al.

A. LOUIS MONACELL, *Primary Examiner.*

HYMAN LORD, *Examiner.*